US005319854A

United States Patent [19]

Pracht

[11] Patent Number: 5,319,854

[45] Date of Patent: Jun. 14, 1994

[54] SCISSORS

[76] Inventor: Günther Pracht, 17, Nettelbeckstr., D-5650 Solingen, Fed. Rep. of Germany

[21] Appl. No.: 977,512

[22] Filed: May 19, 1992

[30] Foreign Application Priority Data

May 28, 1991 [DE] Fed. Rep. of Germany ....... 4117396

[51] Int. Cl.[5] ....................... B26B 13/00; B26B 13/18; F16B 13/04

[52] U.S. Cl. ....................................... 30/254; 30/194; 411/369

[58] Field of Search ......................... 30/254, 194, 145; 411/246, 302, 303, 304, 369, 427, 929.2, 930

[56] References Cited

U.S. PATENT DOCUMENTS

| | | | |
|---|---|---|---|
| 3,711,747 | 1/1973 | Wagner | 411/930 |
| 4,248,285 | 2/1981 | Flaig | 411/246 |
| 4,347,026 | 8/1982 | Schelhas et al. | 411/302 |
| 4,408,927 | 10/1983 | Fraiberg | 411/303 |
| 4,701,088 | 10/1987 | Crull | 411/369 |
| 4,887,951 | 12/1989 | Hashimoto | 411/369 |
| 5,060,381 | 10/1991 | Taberlet | 30/194 |
| 5,193,603 | 3/1993 | Fukushima et al. | 411/369 |

FOREIGN PATENT DOCUMENTS

| | | | |
|---|---|---|---|
| 3023057 | 4/1982 | Fed. Rep. of Germany . | |
| 1486647 | 9/1977 | United Kingdom | 411/246 |

*Primary Examiner*—Richard K. Seidel
*Assistant Examiner*—Paul M. Heyrana, Sr.
*Attorney, Agent, or Firm*—Diller, Ramik & Wight

[57] ABSTRACT

In a pair of scissors, particularly hairdresser's scissors, with a pivot joint consisting of a pivot screw (1) and a screw nut (18), where the pivot screw (1) is connected to one scissor blade (21) in an essentially non-rotating fashion, play between the pivot screw (1) and the one scissor blade (21) is to be prevented by providing the screw nut (18) with an annular groove (10) in its inner wall, in which an annular body (11) made of flexible material is located, the inside diameter of which is smaller that the thread diameter of the pivot screw (1), and by the screw nut (18) additionally having a flexible moulding (22) on its inner face, which contacts the screw nut (18) and the wall of the drilled hole (20) in the one scissor blade (21) when under pressure.

10 Claims, 5 Drawing Sheets

SCISSORS

BACKGROUND OF THE INVENTION

The invention relates to a pair of scissors, particularly hairdresser's scissors, with a pivot joint comprising a pivot screw and a screw nut, where the pivot screw is connected to one scissor blade in an essentially non-rotating fashion and the screw nut has a flexible body on the circumference of a neck which engages a circular recess in the drilled hole of one scissor blade, or on the face pointing towards the drilled hole, said body contacting the screw nut and the wall of the drilled hole under pressure.

Scissors of this kind are known from German Patent DE-PS 30 23 057. In these scissors, the steel screw nut of the pivot joint has a circular groove around the circumference of its neck, in which a flexible O-ring is inserted. The O-ring contacts the neck of the screw nut and the wall of the drilled hole in the one scissor blade under pressure. Rotation of the screw nut is said to be prevented as a result of the pressure exerted on the neck of the screw nut by the O-ring. In this context, the contact pressure is selected in such a way that the action of the scissors can be sensitively adjusted by turning the screw nut.

The pivot screw in the scissors known from the aforementioned publication has two milled surfaces on opposite sides of its shank, engaging an appropriately shaped aperture in the one scissor blade, the upper blade, in such a way that it is connected to the upper blade of the scissors in an essentially non-rotating fashion.

However, when manufacturing scissors of this kind in bulk, it is impossible to achieve complete freedom from rotation of the connection between pivot screw and upper blade. Consequently, this connection has a certain amount of play which is inherent in the manufacturing process. As the screw nut contacts the upper blade of the scissors in a non-rotating fashion owing to the O-ring on the neck, this play gives rise to play between the screw nut and the pivot screw.

The play between screw nut and pivot screw is particularly disturbing when cutting with precision scissors of the kind mentioned at the start. Modern precision scissors have a closing pressure of approx. 30 g which is set electronically. As a result of the very low closing pressure, the play between the shank of the pivot screw and the aperture in the upper blade or between the screw nut and the pivot screw manifests itself in the form of a jerking effect. These noticeable jerks are unpleasant for the person using the scissors, e.g. the hairdresser. In addition, the jerks increase the wear on the pivot screw. It should be kept in mind in this context that the scissors are operated roughly one thousand times for a normal haircut.

SUMMARY OF THE INVENTION

The invention is based on the task of creating scissors of the kind mentioned at the start where the aforementioned play in the shank of the pivot screw and the aperture in the upper blade or in the screw nut and the pivot screw is prevented and the jerks previously felt when cutting with precision scissors are thus ruled out.

According to the invention, this problem is solved by the screw nut having an annular groove on its inner wall, in which a ring-shaped body made of flexible material is located, the inside diameter of which is smaller than the thread diameter of the pivot screw.

As a result of the measures according to the invention, the screw nut contacts and exerts pressure on the shank of the pivot screw. As, on the other hand, the screw nut makes contact with the upper blade of the scissors in a non-rotating fashion, any play between the pivot screw and the upper blade is avoided. As a result, jerking no longer occurs during cutting, even on precision scissors with an extremely low closing pressure. The inside diameter of the ring-shaped body in contact with the shank of the pivot screw is preferably smaller than the core diameter of the thread of the pivot screw. This dimensioning achieves a higher pressure between screw nut and pivot screw.

In an improvement of the invention, the annular groove is located on the end area of the screw nut which is opposite the drilled hole in the one scissor blade. Here, the end of the screw nut which is opposite the drilled hole in the one scissor blade preferably has a blind hole, the diameter of which is greater than the thread diameter of the pivot screw and in which the annular groove is located.

The annular groove can expediently be located at the end of the blind hole which faces away from the face of the screw nut.

To allow simple rotation of the screw nut in order to adjust the action of the scissors, it has so far been common practice to design the face of the screw nut to include a groove. The screw nut can be operated by inserting a tool into this groove. The use of a groove of this kind is not suitable for the scissors according to the invention if the annular groove is located at the face end of the inside wall of the screw nut.

A further improvement of the screw nut on the basis of the invention is therefore the preferred use of a knurled nut.

On the other hand, the screw nut in accordance with the invention can also be designed as a polygonal nut, e.g. as a hexagon nut. This design has the additional advantage that a relatively small screw nut diameter can be selected. A key for operating the nut can be supplied with the scissors.

As described in DE-PS 30 23 057, the scissors according to the invention can have a screw nut with a neck, around the circumference or face of which an annular groove is located to accommodate a flexible body in the form of an O-ring.

In another, preferred design, the flexible body contacting the screw nut and the wall of the drilled hole in the one scissor blade is designed as a moulding with an outer side adapted to the drilled hole and an inner side adapted to the diameter of the pivot screw and one face contacting the face of the screw nut pointing towards the drilled hole when under pressure. This pressure is produced by tightening the pivot screw or the screw nut. As a result of this pressure, the flexible moulding also exerts a radial force on the shank of the pivot screw, thus intensifying the pressure under which the screw nut contacts with the shank and, consequently, enhancing the action of the annular flexible body located on the inner wall of the screw nut.

In a preferred development of this design, the drilled hole in the one scissor blade has a constriction towards the end facing away from the screw nut and an enlargement in the form of a circular recess towards the end facing the screw nut, the transitional area between the two ends being of conical design. As a result of the conicity of the intermediate area, the force component directed towards the shank of the pivot screw is further intensified when the elastic moulding is compressed by tightening the pivot screw or the screw nut.

The screw nut is expediently designed with a short neck, by which it is guided in the circular recess in the drilled hole or a circular recess in the moulding and which compresses the flexible moulding in the drilled hole.

The cross-section of the constricted end of the drilled hole can match the cross-section of the shank of the pivot screw. In order to prevent rotation of the pivot screw relative to the one scissor blade, the shank is expediently designed with two flat surfaces on opposite sides which can be produced by milling.

In another, preferred design, the inside diameter of the constructed end of the drilled hole is larger than the greatest outside diameter of the pivot screw. In this case, the flexible moulding extends into the constricted end part of the drilled hole. The constricted end part of the drilled hole is punched out in a rectangular shape in order to prevent rotation of the shank of the pivot screw relative to the scissor blade in question.

In comparison with an annular flexible body located on the circumference of the neck of the screw nut, the flexible moulding has the advantage that the pivot joint can be adjusted reliably even by a non-expert. As the annular body located on the circumference of the neck of the screw nut creates pressure between the screw nut and the inner wall of the drilled hole in the one scissor blade even when connected only loosely, it is not easy for a non-expert to set the pivot joint correctly, particularly when re-adjusting and re-assembling the scissors after cleaning. In this case, the pivot joint becomes loose after a certain time, after having appeared to be tight at the start. In contrast, absolutely reliable setting is permitted by using the moulding which is adapted to the inner wall of the drilled hole and which is compressed by tightening the pivot joint.

A number of preferred examples of the design of the invention are described below on the basis of the drawings. The contents of the drawings are as follows:

DESCRIPTION OF THE PREFERRED EMBODIMENTS

Figure 1:
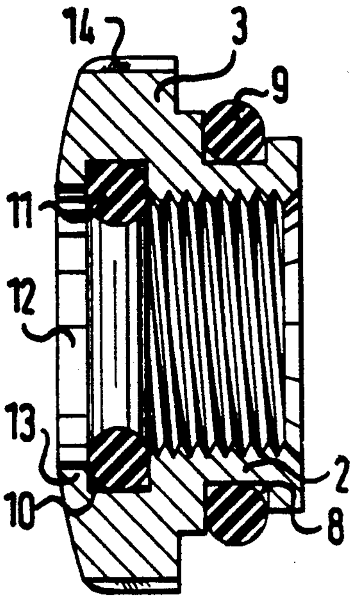
FIG. 1 is a longitudinal section through a screw nut
Figure 2:
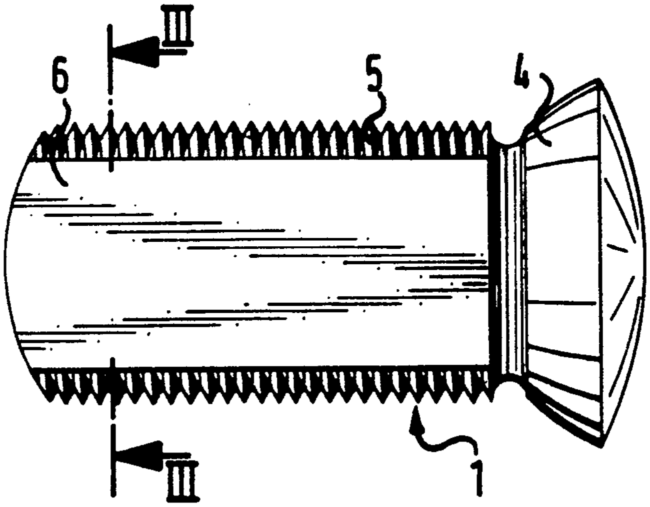
FIG. 2 is a side view of a pivot screw belonging to the screw nut as per FIG. 1
Figure 3:
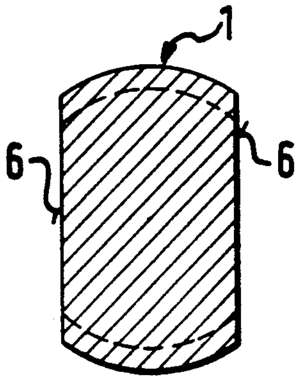
FIG. 3 is a cross-section through the shank of the pivot screw as per FIG. 2

The pivot joint for scissors illustrated in FIGS. 1 to 5 consists of pivot screw 1 and screw nut 3 with neck 2. The rear side of head 4 of pivot screw 1 is dome-shaped around the circumference, this part lying in a pan-shaped recess in the lower blade of the scissors which can also be formed by a suitable contact part. Shank 5 of pivot screw 1 has two parallel flats 6.

Shank 5 of pivot screw 1 passes through an aperture in the lower blade with play, as well as through an aperture in the upper blade with play which is present only as a result of the manufacturing process and is as small as possible. The aperture in the upper blade has flats corresponding to flats 6 of shank 5 of pivot screw 1, these interacting with shank 5 in such a way that pivot screw is connected to the top blade in a non-rotating fashion apart from the aforementioned play.

Screw nut 3 shown in FIG. 1 is guided on the threaded end of pivot screw 1. Its neck 2 rests in a circular recess in the upper blade.

Neck 2 has an annular groove 8 around its circumference, in which an annular body 9 made of flexible material rests and makes contact under pressure with neck 2 of screw nut 3 and the wall of the recess in the upper blade of the scissors.

As further shown in FIG. 1, the inner wall of screw nut has an annular groove 10, in which a further annular body 11 made of flexible material is located, the inside diameter of which is smaller than the thread diameter and, in addition, is slightly smaller than the core of the thread of pivot screw 1. When screw nut 3 and pivot screw 1 interact, this annular body 11 is under pressure and contacts the inner wall of screw nut 3 and shank 5 of pivot screw 1.

On the face opposite neck 2, screw nut 3 has a blind hole 12, the diameter of which is larger than the thread diameter of pivot screw 1. Annular groove 10 is located at the end of blind hole 12 pointing away from the face of screw nut 3. The annular projection 13 of the inner wall at the face end of screw nut 3 prevents annular body 11 from falling out.

To allow screw nut 3 to be turned easily in order to adjust the action of the scissors, screw nut 3 has a knurled edge 14, as shown in FIG. 1.

Figure 4:
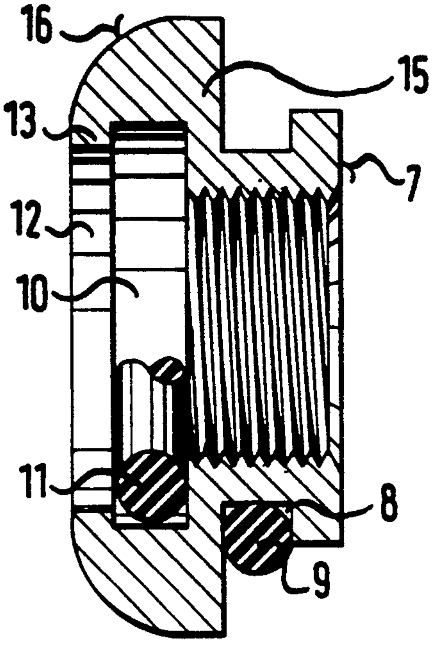
FIG. 4 is a longitudinal section through a screw nut of different design
Figure 5:
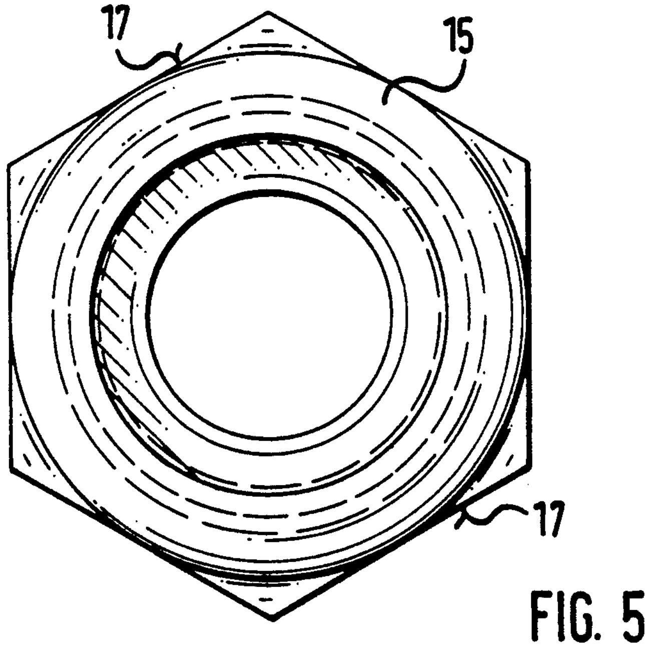
FIG. 5 is a top view of the face end of the screw nut as per FIG. 4

FIGS. 4 and 5 show another practical example of a screw nut 15 which has a neck 7 and is designed as a hexagon nut. The face end of screw nut 15 merges into a dome-shaped area 16 which is followed by an are 17 consisting of 6 flat sides. In all other respects, screw nut 15 is designed in the same way as the screw nut described in the preceding example. In particular, it displays a blind hole 12 on its face, at the end of which an annular groove 10 is located to accommodate a flexible annular body 11.

In the further practical example of a pair of scissors shown in FIGS. 6 to 9, the flexible body contacting screw nut 18 and wall 19 of drilled hole 20 in the one scissor blade 21 is designed as a moulding 22, the outer side of which is adapted to drilled hole 20 and the inner side to the diameter of pivot screw 1, and one face 23 of which contacts the face of screw nut 18 pointing towards drilled hole 20 when under pressure. Flexible moulding 22 is manufactured in the form of a rubber-like, highly elastic plastic injection moulding.

The drilled hole 20 in the one scissor blade 21 has a constriction in its end section 24 facing away from screw nut 18, while end section 25 facing towards screw nut 18 is enlarged in the form of a circular recess, with the transitional region 26 between the two end sections 24 and 25 being of conical design. Screw nut 18 has a short neck 27, by which it is guided in a circular recess in moulding 22 and which compresses flexible moulding 22 between the wall of drilled hole 20 and shank 5 of pivot screw 1. This produces a frictional connection between screw nut 18 and shank 5 of pivot screw 1 via flexible moulding 22. This frictional connection intensifies the effect of the annular flexible body located in annular groove 10 of screw nut 18.

In this version, an additional radial frictional connection is achieved between neck 27, screw nut 18 and moulding 22. On the other hand, it is sufficient to provide moulding 22 with a plane face and design the neck of the nut in such a way that it is guided in the recess in drilled hole 20.

Figure 7:
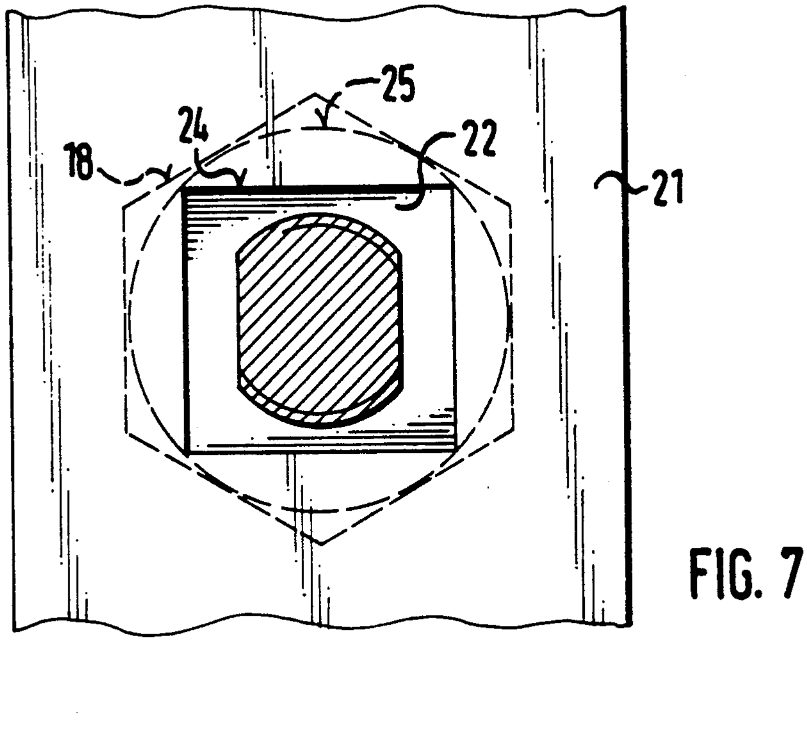
FIG. 7 is a section along line VII—VII in FIG. 6
Figure 8:
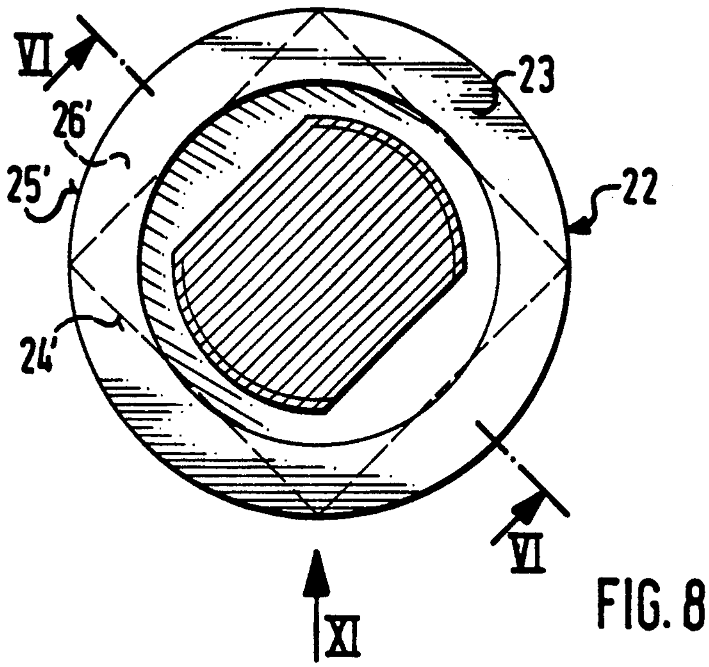
FIG. 8 is a face-end view of the flexible moulding, shown in FIG. 6 as a section along line VI—VI
Figure 9:
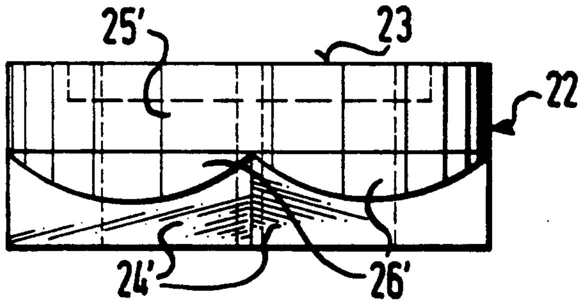
FIG. 9 is a side view of the moulding as per FIG. 8, in the direction of arrow IX

End section 24 of drilled hole 20, facing away from screw nut 18, is designed in the form of a rectangular punched hole, as indicated in FIG. 7. The diameter of this punched hole is larger at all points than the diameter of shank 5 of pivot screw 1, with the result that flexible moulding 22 extends between constricted end section 24 and shank 5 of pivot screw 1. Pivot screw 1 is adequately prevented from rotating relative to the one scissor blade 21 as a result of the cross-sectional shape of shank 5 and constricted end section 24.

Drilled hole 20 in scissor blade 21 can be produced by first drilling a cylindrical hole in scissor blade 21 with a diameter corresponding roughly to the smallest diameter of constricted end section 24. Enlarged end section 25, facing screw nut 18, is then produced in the form of a circular recess by drilling a corresponding blind hole. Conical transitional region 26 is obtained by using a twist drill. The angle of this region is determined by the twist drill in this case and is preferably 60° relative to the axial direction of drilled hole 20. Constricted end section 24 of the cylindrical drilled hole is subsequently enlarged into a rectangular cross-sectional form by punching out.

Both enlarged end section 25 and constricted end section 24 of flexible moulding 22 are adapted to drilled hole 20 in scissor blade 21 on the outside and to the cross-section of shank 5 of pivot screw 1 on the inside. The shape of moulding 22 is presented more accurately in FIGS. 8 and 9. The moulding walls corresponding to sections 24, 25 and 26 of drilled hole 20 are marked 24', 25' and 26' in FIGS. 8 and 9. Adequate protection against rotation of pivot screw 1 relative to scissor blade 21 is ensured as a result of the square hole punched out in constricted section 24 and the flats on the sides of shank 5 of pivot screw 1. Moulding 22 contacts drilled hole 20 and shank 5 when under pressure, thus also preventing play between pivot screw 1 and drilled hole 20.

Figure 6:
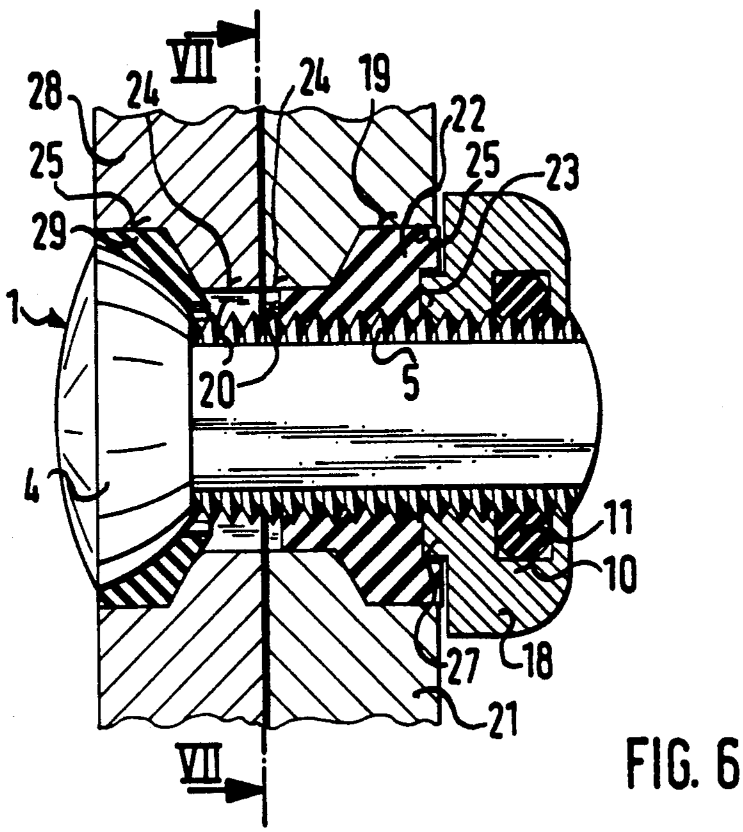
FIG. 6 is a section through another version of the pivot joint of a pair of scissors

As can be seen from FIG. 6, the other scissor blade 28, the lower blade, is provided with an identical drilled hole 20. As the diameter of constricted end section 24 is larger at all points than the diameter of shank 5, pivot screw 1 can rotate relative to the other scissor blade 28. The underside of head 4 of pivot screw 1 is dome-shaped and rests on a plastic sliding ring 29 in enlarged end section 25 of drilled hole 20.

Figure 10:
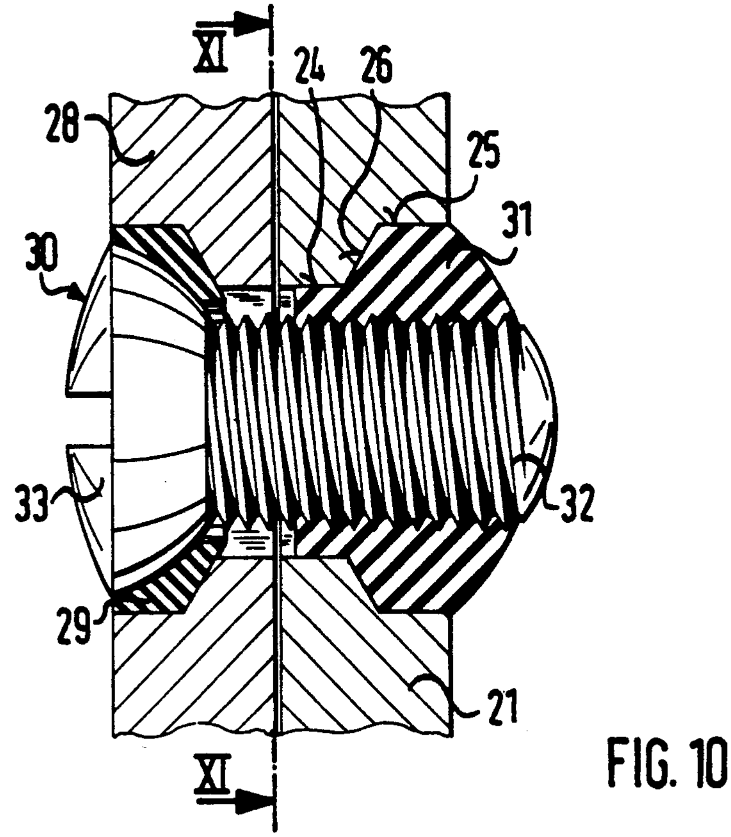
FIG. 10 is a section through a different, simple design of pivot joint for a pair of scissors
Figure 11:
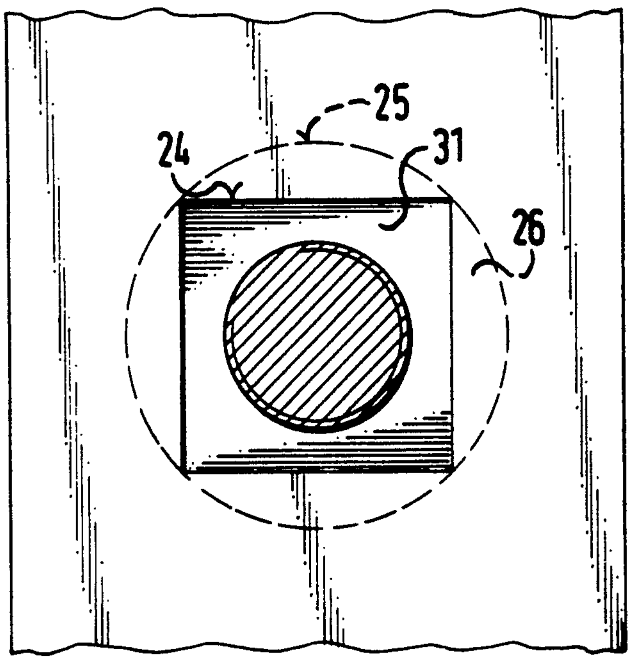
FIG. 11 is a section along line XI—XI in FIG. 10

The fact that these scissor blades are of identical design in the region of the pivot joint leads not only to simplified stocking and a reduction of the manufacturing effort. In addition to the precision connection considered here, they also allow the use of a simpler, low-cost pivot joint for the identical scissor blades 21 and 28. This simple version is presented in FIGS. 10 and 11. In this case, pivot screw 30 is combined with a plastic nut 31, into which the screw cuts the thread as it is screwed in. Screw nut 31 is self-locking on shank 32. A plastic sliding ring 29 is located below the screw head 33, the underside of which is of a dome-shaped design. As the plastic nut can only be used with a relatively large thread pitch in this simple version, precision adjustment, such as is the object of the present invention, is not possible with a nut of this kind.

LIST OF REFERENCE NUMBERS

1 Pivot screw
2 Neck
3 Screw nut
4 Head
5 Shank
6 Flat
7 Neck
8 Annular groove
9 Annular body
10 Annular groove
11 Annular body
12 Blind hole
13 Annular projection
14 Knurled edge
15 Screw nut
16 Dome-shaped area
17 Hexagonal area
18 Screw nut
19 Wall
20 Drilled hole
21 One scissor blade
22 Moulding
23 Face
24 End section
24' Wall
25 End section
25' Wall
26 Transitional section
26' Wall
27 Neck
28 Other scissor blade
29 Plastic sliding ring
30 Pivot screw
31 Screw nut
32 Shank
33 Screw head

I claim:

1. Scissors comprising a pivot joint including a pivot screw (1) with a thread diameter and a screw nut (3), said pivot screw (1) being connected to one scissor blade (21) in an essentially nonrotatable fashion, said screw nut (3) having a flexible body on an exterior circumference thereof which engages a surface of a drilled hole (20) of said one scissor blade (21), said flexible body (9) contacting said screw nut (3) and said drilled hole surface upon threaded engagement of the screw nut (3) relative to the pivot screw (1), said screw nut (3) having an annular groove (10) in an inner peripheral wall thereof, and an annular body (11) of flexible material located in said annular groove (10), wherein an inner diameter of said annular body (11) is smaller than the thread diameter of the pivot screw (1).

2. Scissors as in claim 1, characterised in that the inner diameter of the annular body (11) is smaller than the core diameter of the thread of the pivot screw (1).

3. Scissors as in claim 1, characterised in that a face of the screw nut (3; 15; 18) opposite the drilled hole (20) in the one scissor blade (21) has a blind hole (12), the diameter of which is greater than the thread diameter of the pivot screw (1) and in that the annular groove (10) is located in the blind hole (12).

4. Scissors as in claim 3, characterised in that the annular groove (10) is located at the end of the blind hole (12) pointing away from the face of the screw nut (3; 15; 18).

5. Scissors as in claim 3, characterised in that the screw nut (3) is designed as a knurled nut.

6. Scissors as in claim 3, characterised in that the screw nut (15; 18) is designed as a polygonal nut.

7. Scissors as in claim 1, characterised in that the flexible body contacting the screw nut (18) and the wall (19) of the drilled hole (20) in the one scissor blade (21) is designed as a moulding (22), with an outer side adapted to the drilled hole (20) and an inner side adapted to the diameter of the pivot screw (1) and one face (23) of which contacts the face of the screw nut (18) pointing towards the drilled hole (20) when under pressure.

8. Scissors as in claim 7, characterised in that the drilled hole (20) has a constriction in an end section (24) facing away from the screw nut (18) and an enlargement in the form of a circular recess in an opposite end section (25) facing towards the screw nut (18), a transitional section (26) between the two end sections (24, 25) being of conical design.

9. Scissors as in claim 8, characterised in that the screw nut (18) is guided by a short neck (27) in the circular recess in the drilled hole (20) or in a circular recess in the moulding (22).

10. Scissors as in claim 9, characterised in that the end section (24) of the drilled hole (20) which faces away from the screw nut (18) has a rectangular punched-out hole.

* * * * *